US012646451B2

(12) United States Patent
Kim

(10) Patent No.: US 12,646,451 B2
(45) Date of Patent: Jun. 2, 2026

(54) DISPLAY DEVICE AND ELECTRONIC APPARATUS INCLUDING THE SAME

(71) Applicant: Samsung Display Co., LTD., Yongin-si (KR)

(72) Inventor: Woung Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/024,163

(22) Filed: Jan. 16, 2025

(65) Prior Publication Data

US 2025/0391319 A1 Dec. 25, 2025

(30) Foreign Application Priority Data

Jun. 20, 2024 (KR) ........................ 10-2024-0080508
Aug. 29, 2024 (KR) ........................ 10-2024-0116845

(51) Int. Cl.
*G09G 3/32* (2016.01)
*G09G 3/3291* (2016.01)

(52) U.S. Cl.
CPC ............ *G09G 3/32* (2013.01); *G09G 3/3291* (2013.01); *G09G 2300/0842* (2013.01); *G09G 2310/0275* (2013.01); *G09G 2320/0276* (2013.01); *G09G 2360/16* (2013.01)

(58) Field of Classification Search
CPC ... G09G 2320/0673; G09G 2320/0276; G09G 2320/0233; G09G 2320/0626; G09G 3/3233; G09G 3/3688; G09G 3/3648; G09G 3/36; G09G 3/3275; G09G 3/3696; G09G 3/3208; G09G 3/32961; G09G 3/32; G09G 3/3266; G09G 3/3258; G09G 3/3225; G09G 2310/027; G09G 2310/08; G09G 2310/0291; G09G 2310/0297; G09G 2300/0842; G09G 2300/0819; G09G 2300/0426; G09G 2300/0861; G09G 2330/028; G09G 2360/16
See application file for complete search history.

(56) References Cited

U.S. PATENT DOCUMENTS

| | | | | |
|---|---|---|---|---|
| 11,170,689 | B2 | 11/2021 | Pyo et al. | |
| 11,967,263 | B2 | 4/2024 | Lee et al. | |
| 12,020,629 | B2 | 6/2024 | Chae | |
| 2013/0076864 | A1 * | 3/2013 | Takahashi ............ | H04N 13/356 348/46 |

FOREIGN PATENT DOCUMENTS

| | | | |
|---|---|---|---|
| KR | 1020200101570 | A | 8/2020 |
| KR | 1020220017274 | A | 2/2022 |
| KR | 1020230064035 | A | 5/2023 |

* cited by examiner

*Primary Examiner* — Dong Hui Liang
(74) *Attorney, Agent, or Firm* — CANTOR COLBURN LLP

(57) ABSTRACT

A display device includes a display panel including pixels, and a data driver configured to generate a data voltage based on image data. The data driver includes a mode determiner configured to generate mode data about driving of the display panel, a gamma generator configured to generate an analog gamma voltage and a digital gamma voltage based on the mode data, and a data voltage generator configured to generate a data voltage based on the analog gamma voltage and the digital gamma voltage.

20 Claims, 9 Drawing Sheets

AOFS: AOFS1, AOFS2
AOFS1: AOFS1_1, AOFS1_2
AOFS2: AOFS2_1, AOFS2_2

DISPLAY DEVICE AND ELECTRONIC APPARATUS INCLUDING THE SAME

This application claims priority to and priority to Korean Patent Application No. 10-2024-0080508, filed on Jun. 20, 2024, and Korean Patent Application No. 10-2024-0116845, filed on Aug. 29, 2024, and all the benefits accruing therefrom under 35 U.S.C. § 119, the content of which in their entirety is herein incorporated by reference.

BACKGROUND

1. Field

Embodiments of the disclosure relate to a display device and an electronic apparatus including the same.

2. Description of the Related Art

A display device includes a data driver for supplying data signals to data lines, a gate driver for supplying gate signals to gate lines, and pixels positioned to be connected to the data lines and the gate lines.

In this case, the data driver may include a gamma generator for generating a data signal. In this case, a gamma voltage generated by the gamma generator may need to be compensated for according to the driving frequency and gradation of a display panel.

SUMMARY

When gamma voltages according to the driving frequency and gradation of the display panel are all stored in a memory to improve reliability, the storage capacity of the memory may be relatively insufficient.

A display device and an electronic apparatus in an embodiment of the disclosure are directed to freely varying a driving frequency of a display panel and also securing a relatively sufficient storage space.

A display device in an embodiment of the disclosure includes a display panel including pixels, and a data driver configured to generate a data voltage based on image data. The data driver includes a mode determiner configured to generate mode data about driving of the display panel, a gamma generator configured to generate an analog gamma voltage and a digital gamma voltage based on the mode data, and a data voltage generator configured to generate a data voltage based on the analog gamma voltage and the digital gamma voltage.

In an embodiment, the mode data may include information about a driving frequency of the display panel and a gradation of an image displayed by the display panel.

In an embodiment, the gamma generator may include a digital gamma generator configured to generate the digital gamma voltage, the digital gamma generator may include a first offset determiner including a first reference gamma unit configured to calculate a first reference gamma voltage, and the first reference gamma voltage may have a representative value of a first digital gamma voltage and a second digital gamma voltage that is different from the first digital gamma voltage.

In an embodiment, the first digital gamma voltage may be gamma data for each gamma code when the display panel is driven at a first frequency, and the second digital gamma voltage may be gamma data for each gamma code when the display panel is driven at a second frequency different from the first frequency.

In an embodiment, the first offset determiner may include a first offset unit configured to calculate a first digital offset which is a difference value between values of the first digital amma voltage and values of the first reference gamma voltage, and a second offset unit configured to calculate a second digital offset which is a difference value between values of the second digital gamma voltage and the values of the first reference gamma voltage.

In an embodiment, the first offset determiner may include a first memory configured to store the first reference gamma voltage, the first digital offset, and the second digital offset.

In an embodiment, the first offset determiner may output a digital gamma voltage offset by selecting one of the first digital offset and the second digital offset based on the mode data.

In an embodiment, the digital gamma generator may include a digital gamma calculator configured to output the digital gamma voltage based on the first reference gamma voltage, the digital gamma voltage offset, and the image data.

In an embodiment, the gamma generator may include an analog gamma generator configured to generate the analog gamma voltage, and the analog gamma generator may include a second offset determiner including a second reference gamma unit configured to generate a second reference gamma voltage.

In an embodiment, the second reference gamma voltage may have a representative value of a first analog gamma voltage and a second analog gamma voltage that is different from the first analog gamma voltage.

In an embodiment, the first analog gamma voltage may be gamma data when a predetermined area of the display panel is driven at first luminance, and the second analog gamma voltage may be gamma data when the predetermined area of the display panel is driven at second luminance different from the first luminance.

In an embodiment, the second offset determiner may include a third offset unit configured to calculate a first analog offset which is a difference value between values of the first analog gamma voltage and values of the first reference gamma voltage, and a fourth offset unit configured to calculate a second analog offset which is a difference value between values of the second digital gamma voltage and the values of the first reference gamma voltage.

In an embodiment, the second offset determiner may include a second memory configured to store the second reference gamma voltage, the first analog offset, and the second analog offset.

In an embodiment, the second offset determiner may output an analog gamma voltage offset by selecting one of the first analog offset and the second analog offset based on the mode data.

In an embodiment, the analog gamma generator may include a digital gamma calculator configured to output a digital gamma voltage based on the second reference gamma voltage, the analog gamma voltage offset, and the image data.

Another embodiment of the invention relates to an electronic apparatus. The electronic apparatus in an embodiment of the disclosure includes a processor configured to provide image data to a display device, and the display device configured to display an image based on the image data. The display device includes a display panel including pixels, and a data driver configured to generate a data voltage based on the image data, and the data driver incudes a mode determiner configured to generate mode data about driving of the display panel, a gamma generator configured to generate an analog gamma voltage and a digital gamma voltage based on the mode data, and a data voltage generator configured to generate a data voltage based on the analog gamma voltage and the digital gamma voltage.

BRIEF DESCRIPTION OF THE DRAWINGS

The above and other embodiments, advantages and features of this disclosure will become more apparent by describing in further detail embodiments thereof with reference to the accompanying drawings.

DETAILED DESCRIPTION

Figure 1:
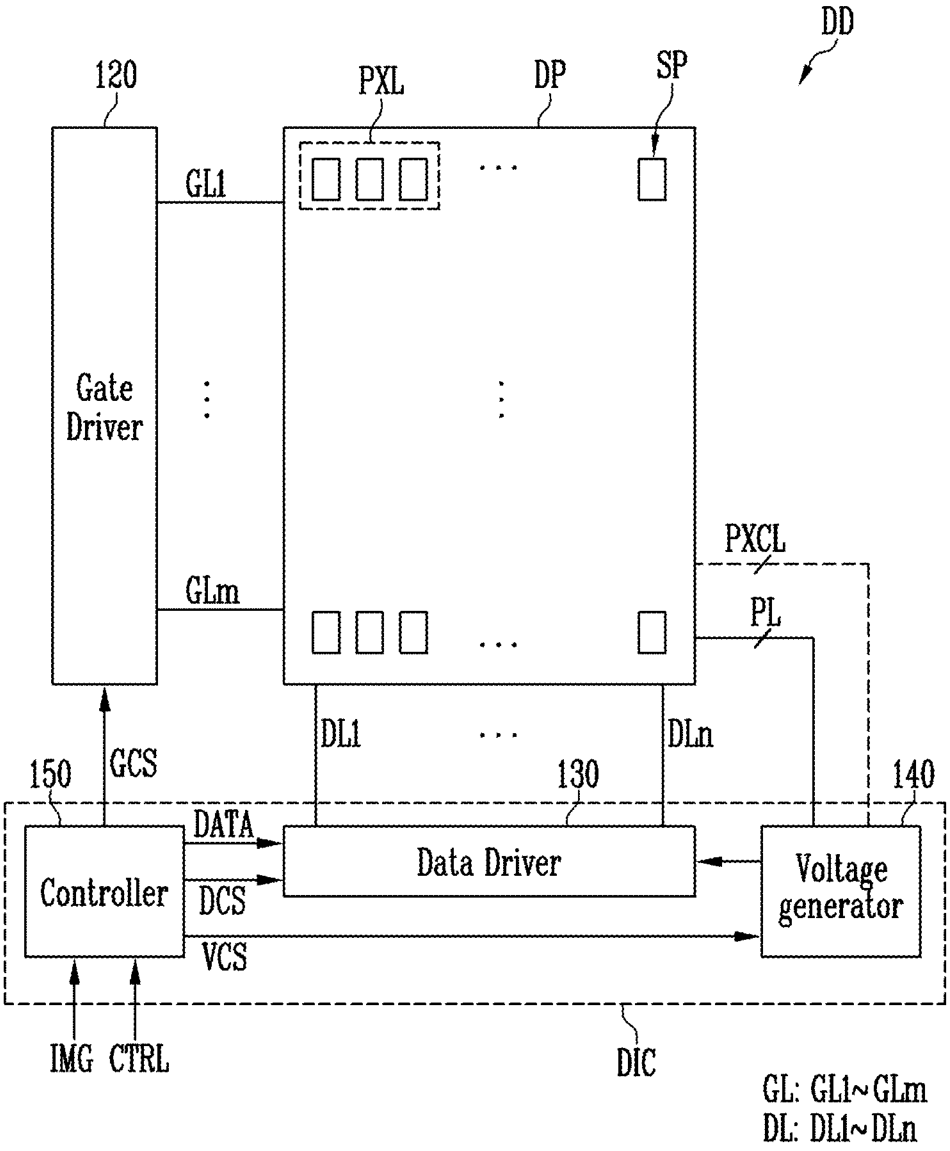
FIG. 1 is a block diagram illustrating an embodiment of a display device.

Hereinafter, embodiments of the invention will be described in detail with reference to the accompanying drawings. In the following description, it should be noted that only portions desired for comprehension of operations according to the invention will be described and descriptions of other portions will be omitted not to make subject matters of the invention obscure. In addition, the invention is not limited to the following described embodiments but may also be embodied in other forms. Rather, these embodiments are provided so that the invention will be thorough, and complete, and will fully convey the invention to those skilled in the art.

Throughout the specification, it will be understood that when an element is referred to as being "coupled" or "connected" to another element, it may be directly coupled or connected to the other element or intervening elements may be therebetween. The terminology used herein is for the purpose of describing illustrative embodiments and is not intended to limit the invention. Throughout the specification, unless explicitly described to the contrary, the word "comprise" and variations such as "comprises" or "comprising" will be understood to imply the inclusion of stated elements but not the exclusion of any other elements. "At least any one of X, Y, and Z" and "at least any one selected from the group consisting of X, Y, and Z" may be construed as each of X, Y, and Z or a combination of two or more of X, Y, and Z (for example, XYZ, XYY, YZ, and ZZ). As used herein, "and/or" includes one or more combinations of corresponding components.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the invention.

Spatially relative terms, such as "beneath," "below," "lower," "above," "upper," and the like, may be used herein for descriptive purposes, and, thereby, to describe one element or feature's relationship to another element(s) or feature(s) as shown in the drawings. Spatially relative terms are intended to encompass different orientations of a device in use, operation, and/or manufacture in addition to the orientation depicted in the drawings. For example, if the device in the drawings is turned over, elements described as "below" or "beneath" other elements or features would then be oriented "above" the other elements or features. Thus, in one embodiment, the term "below" may encompass both an orientation of above and below. directions. Furthermore, the device may be otherwise oriented (e.g., rotated 90 degrees or at other orientations), and, as such, the spatially relative descriptors used herein interpreted accordingly.

The term such as "unit", "determiner", "generator" and "processor" as used herein is intended to mean a hardware component such as a circuitry that performs a predetermined function. The hardware component may include a field-programmable gate array ("FPGA") or an application-specific integrated circuit ("ASIC"), for example.

Various embodiments are described with reference to drawings that schematically illustrate ideal embodiments. Accordingly, it will be expected that the shapes may vary depending, for example, on tolerances and/or manufacturing techniques. Accordingly, the embodiments disclosed herein should not be construed as limited to the predetermined shapes shown herein, but should be construed to include deviations in shapes that result from, for instance, manufacturing. As such, the shapes shown in the drawings may not depict the actual shapes of regions of the device, and the disclosure is not limited thereto.

FIG. 1 is a block diagram illustrating an embodiment of a display device.

Referring to FIG. 1, a display device DD may include a display panel DP, a gate driver 120, a data driver 130, a voltage generator 140, and a controller 150.

The display panel DP includes subpixels SP. The subpixels SP may be connected to the gate driver 120 through the first to $m^{th}$ gate lines GL1 to GLm (m is a natural number). In the description, the first to $m^{th}$ gate lines GL1 to GLm may be collectively referred to as gate lines GL. The subpixels SP may be connected to the data driver 130 through the first to $n^{th}$ data lines DL1 to DLn (n is a natural number). In the description, the first to $n^{th}$ data lines DL1 to DLn may be collectively referred to as data lines DL.

The subpixels SP may generate light with two or more colors. In an embodiment, each of the subpixels SP may generate light such as red, green, blue, cyan, magenta, or yellow light, for example.

Two or more subpixels among the subpixels SP may constitute one pixel PXL. In an embodiment, a pixel PXL may include three subpixels as shown in FIG. 1, for example. In this way, the pixel PXL may emit light with various colors and various luminances according to the combination of pieces of light emitted from the subpixels included in the pixel PXL.

The gate driver 120 is connected to the subpixels SP arranged in a row direction through the first to $m^{th}$ gate lines GL1 to GLm. The gate driver 120 may output gate signals to the first to $m^{th}$ gate lines GL1 to GLm in response to a gate control signal GCS. In an embodiment, the gate control signal GCS may include a start signal indicating the start of each frame, a horizontal synchronization signal, or the like.

The gate driver 120 may be disposed at one side of the display panel DP. However, the disclosure is not limited thereto. In an embodiment, the gate driver 120 may be divided into two or more physically and/or logically separated drivers, and such drivers may be disposed at one side of the display panel DP and an opposite side of the display panel DP opposite the one side. In this way, the gate driver 120 may be disposed around the display panel DP in various shapes.

The data driver 130 is connected to the subpixels SP arranged in a column direction through the first to $n^{th}$ data lines DL1 to DLn. The data driver 130 receives image data DATA and a data control signal DCS from the controller 150. The data driver 130 operates in response to the data control signal DCS. In an embodiment, the data control signal DCS may include a source start signal, a source shift clock, a source output enable signal, or the like.

The data driver 130 may receive voltages from the voltage generator 140. The data driver 130 may apply data signals having gradation voltages corresponding to the image data DATA to the first to $n^{th}$ data lines DL1 to DLn using the received voltages. When a gate signal is applied to each of the first to $m^{th}$ gate lines GL1 to GLm, data signals corresponding to the image data DATA may be applied to the first to $n^{th}$ data lines DL1 to DLn. Accordingly, the subpixels SP may generate light corresponding to the data signals, and the display panel DP may display an image.

In an embodiment, the data driver 130 may generate gamma voltages (or gamma data) corresponding to each of all gradations and may convert the image data DATA in a digital form into data signals in an analog form using the gamma voltages. Here, the gamma voltages may be used to generate data signals (or data voltages) corresponding to a gradation value in the image data DATA. The gamma voltages may include 2048 gamma voltages corresponding to 11-bit data, but this is merely one of embodiments and the invention not limited thereto.

The data driver 130 may vary a driving frequency and luminance of an image displayed by the display panel DP based on an external input signal or the image data DATA. In an embodiment, the data driver 130 may vary a driving frequency and luminance of an image displayed by the display panel DP and may vary gamma voltages based on the varied driving frequency and luminance, for example. Here, the driving frequency may be a frequency at which the data driver 130 is driven and may be the same as a frequency of output data signals. In an embodiment, the data driver 130 may vary the driving frequency from 60 hertz (Hz) to 48 Hz, 85 Hz, 120 Hz, or the like and may adjust the gamma voltages in response to the varied driving frequency, for example. In addition, the data driver 130 may vary luminance of an image displayed by the display panel DP to 1 nit, 3 nits, 20 nits, 500 nits, 1500 nits, or the like and may adjust gamma voltages in response to the varied luminance.

The voltage generator 140 may operate in response to a voltage control signal VCS from the controller 150. The voltage generator 140 may generate a plurality of voltages and provide the generated voltages to components of the display device DD, such as the gate driver 120, the data driver 130, and the controller 150. The voltage generator 140 may generate a plurality of voltages by receiving an input voltage from the outside of the display device DD and regulating the received voltage.

The voltage generator 140 may generate a first power voltage and a second power voltage. The generated first and second power voltages may be provided to the subpixels SP through power lines PL. In other embodiments, at least one of the first and second power voltages may be provided from outside the display device DD.

In addition, the voltage generator 140 may provide various voltages and/or signals. In an embodiment, the voltage generator 140 may provide one or more initialization voltages to be applied to the subpixels SP, for example. In an embodiment, during a sensing operation of sensing electrical characteristics of transistors and/or light-emitting elements of the subpixels SP, a predetermined reference voltage may be applied to the first to $n^{th}$ data lines DL1 to DLn, and the voltage generator 140 may generate the reference voltage to transmit the generated reference voltage to the data driver 130, for example. In an embodiment, during a display operation of displaying an image on the display panel DP, common pixel control signals may be applied to the subpixels SP, and the voltage generator 140 may generate the pixel control signals, for example. In an embodiment, the voltage generator 140 may provide pixel control signals to the subpixels SP through pixel control lines PXCL. In FIG. 1, the pixel control lines PXCL are illustrated as being connected between the voltage generator 140 and the display panel DP, but the disclosure is not limited thereto. In an embodiment, the pixel control lines PXCL may be connected between the gate driver 120 and the display panel DP, for example. In this case, the pixel control signals may be transmitted from the voltage generator 140 to the pixel control lines PXCL through the gate driver 120.

The controller 150 controls the overall operation of the display device DD. The controller 150 receives input image data IMG and a corresponding control signal CTRL from the outside. The controller 150 may provide the gate control signal GCS, the data control signal DCS, and the voltage control signal VCS in response to the received control signal CTRL.

The controller 150 may output the image data DATA by converting the input image data IMG to be suitable for the display device DD or the display panel DP. In an embodiment, the controller 150 may output the image data DATA by aligning the input image data IMG to be suitable for the subpixels SP in a row unit.

Two or more components of the data driver 130, the voltage generator 140, and the controller 150 may be disposed (e.g., mounted) on one integrated circuit. As shown in FIG. 1, the data driver 130, the voltage generator 140, and the controller 150 may be included in a driver integrated circuit DIC. In this case, the data driver 130, the voltage generator 140, and the controller 150 may be components functionally separated in one driver integrated circuit DIC. In other embodiments, at least one of the data driver 130, the voltage generator 140, and the controller 150 may be provided as a component separated from the driver integrated circuit DIC.

Figure 2:
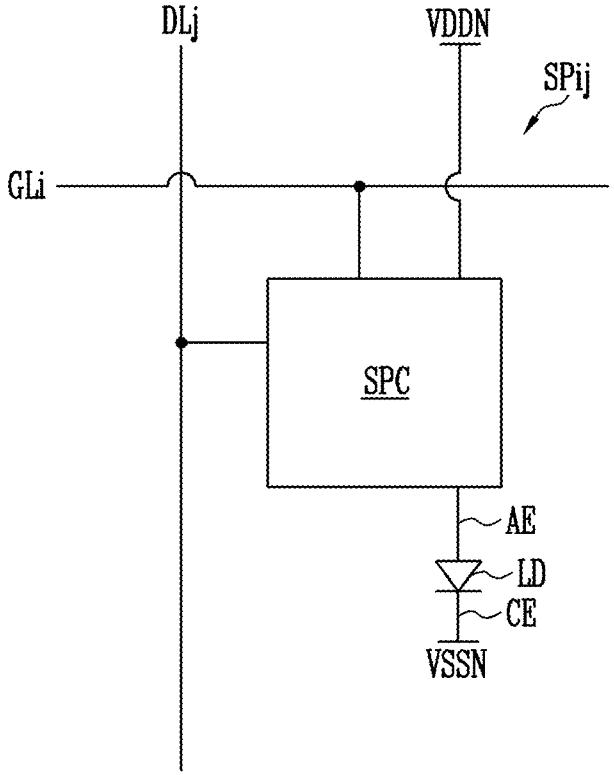
FIG. 2 is a block diagram illustrating an embodiment of any one subpixel of the subpixels of FIG. 1.

FIG. 2 is a block diagram illustrating an embodiment of any one subpixel of the subpixels of FIG. 1. In FIG. 2, among the subpixels SP of FIG. 1, a subpixel SPij disposed in an $i^{th}$ row (i is an integer of 1 to m) and a $j^{th}$ column (j is an integer of 1 to n) is shown as an example.

Referring to FIG. 2, the subpixel SPij may include a subpixel circuit SPC and a light-emitting element LD.

The light-emitting element LD is connected between a first power voltage node VDDN and a second power voltage node VSSN. The first power voltage node VDDN is connected to one of the power lines PL of FIG. 1 to receive a first power voltage. The second power voltage node VSSN is connected to another one of the power lines PL of FIG. 1 to receive a second power voltage. The first power voltage may have a higher voltage level than the second power voltage.

The light-emitting element LD is connected between an anode AE and a cathode CE. The anode AE may be connected to the first power voltage node VDDN through the subpixel circuit SPC. In an embodiment, the anode AE may be connected to the first power voltage node VDDN through one or more transistors included in the subpixel circuit SPC, for example. The cathode CE may be connected to the second power voltage node VSSN. The light-emitting element LD emits light according to a current flowing from the anode AE to the cathode CE.

The subpixel circuit SPC may be connected to an $i^{th}$ gate line GLi among the first to $m^{th}$ gate lines GL1 to GLm of FIG. 1 and a $j^{th}$ data line DLj among the first to $n^{th}$ data lines DL1 to DLn of FIG. 1. In response to a gate signal received through the $i^{th}$ gate line GLi, the subpixel circuit SPC may control the light-emitting element LD to emit light according to a data signal received through the $j^{th}$ data line DLj. In an embodiment, the subpixel circuit SPC may be further connected to the pixel control lines PXCL of FIG. 1. In this case, the subpixel circuit SPC may control the light-emitting element LD in further response to pixel control signals received through the pixel control lines PXCL.

For such operations, the subpixel circuit SPC may include circuit elements such as transistors and one or more capacitors.

The transistors of the subpixel circuit SPC may include P-type transistors and/or N-type transistors. In an embodiment, the transistors of the subpixel circuit SPC may include a metal oxide silicon filed effect transistor ("MOSFET"). In an embodiment, the transistors of the subpixel circuit SPC may include an amorphous silicon semiconductor, a monocrystalline silicon semiconductor, a polycrystalline silicon semiconductor, an oxide semiconductor, or the like.

Figure 3:
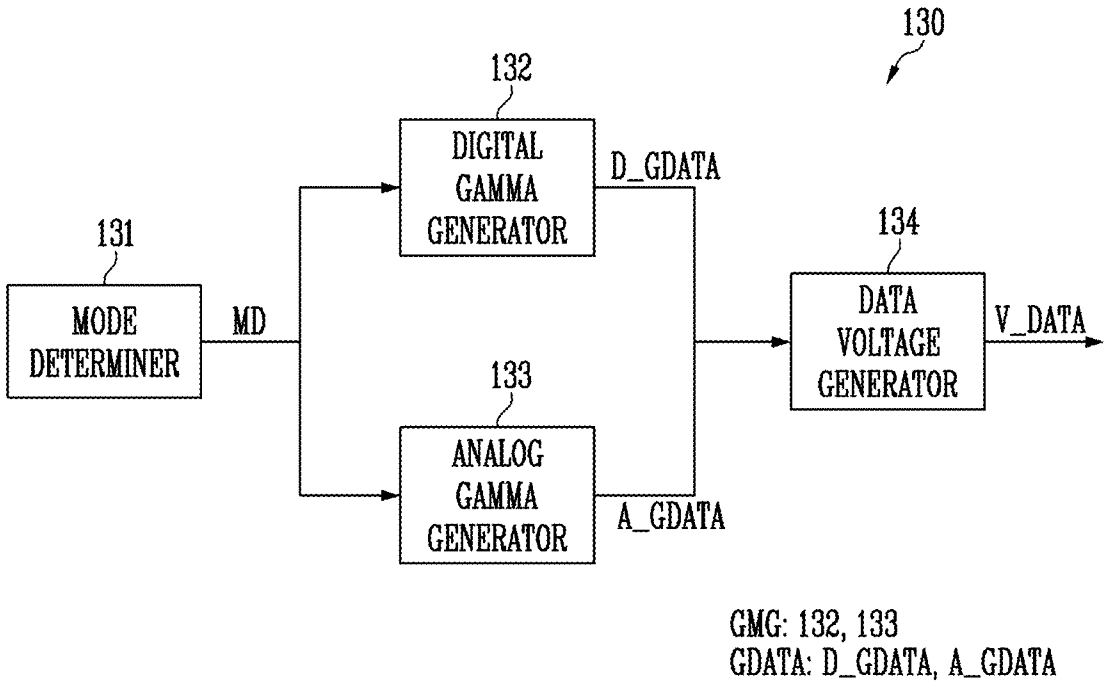
FIG. 3 is a block diagram illustrating an embodiment of a data driver included in the display device of FIG. 1.

FIG. 3 is a block diagram illustrating an embodiment of a data driver included in the display device of FIG. 1.

Referring to FIG. 3, a data driver 130 may include a mode determiner 131, a gamma generator GMG, and a data voltage generator 134.

The mode determiner 131 may generate mode data MD and supply the mode data MD to a digital gamma generator 132 and an analog gamma generator 133. The mode data MD may include information about a driving mode of driving the display device DD (refer to FIG. 1). In this case, the mode data MD may include a gamma enable signal that causes a gamma voltage to be generated.

The mode data MD may include information about a driving frequency of the display panel DP and a luminance of a predetermined area of a display panel DP. In other words, the mode determiner 131 may control the gamma generator GMG such that magnitudes (or ranges) of gamma voltages generated by the gamma generator GMG are changed according to a driving frequency of the display panel DP and a target luminance level of a displayed image.

The gamma generator GMG may include the digital gamma generator 132 and the analog gamma generator 133. The digital gamma generator 132 and the analog gamma generator 133 may generate gamma voltages GDATA. The gamma voltages GDATA may include digital gamma voltages D_GDATA and analog gamma voltages A_GDATA.

The digital gamma generator 132 and the analog gamma generator 133 may be driven based on the mode data MD. In an embodiment, the digital gamma generator 132 may be driven when a driving frequency of the display panel DP is varied and may generate the digital gamma voltage D_GDATA, for example. The analog gamma generator 133 may be driven when a gradation (or luminance) of the display panel DP is varied and may generate the analog gamma voltage A_GDATA. In other words, when both the driving frequency and the gradation (or luminance) of the display panel DP are varied, both the digital gamma generator 132 and the analog gamma generator 133 may be driven.

The data voltage generator 134 may receive the digital gamma voltage D_GDATA and the analog gamma voltage A_GDATA. The data voltage generator 134 may generate a data voltage V_DATA based on the digital gamma voltage D_GDATA and the analog gamma voltage A_GDATA. The data voltage V_DATA may be transmitted to the display panel DP through any one of the data lines DL (refer to FIG. 1).

The data voltage generator 134 may generate the data voltage V_DATA based on the gamma voltages GDATA and image data DATA. In an embodiment, the data voltage generator 134 may include a shift register that transmits the image data DATA, a data latch that latches data received from the shift register, a digital-to-analog converter ("DAC") that converts digital data transmitted through the data latch into a data signal in an analog form based on gamma voltages, and a buffer that outputs the data signal to the outside, for example.

Figure 4:
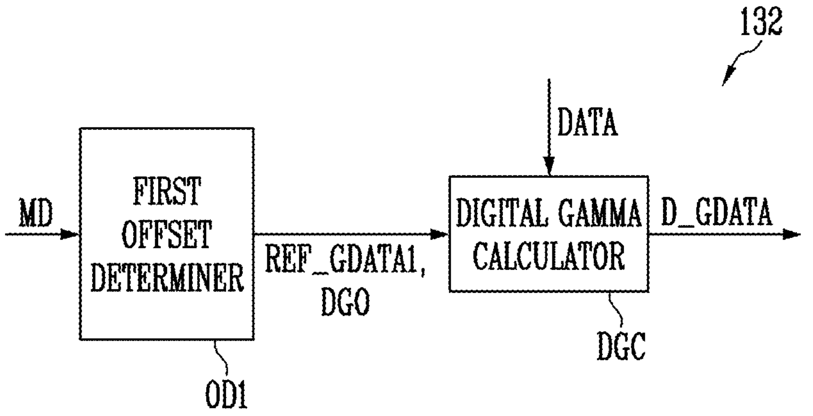
FIG. 4 is a block diagram illustrating an embodiment of a digital gamma generator included in the data driver of FIG. 3.
Figure 5:
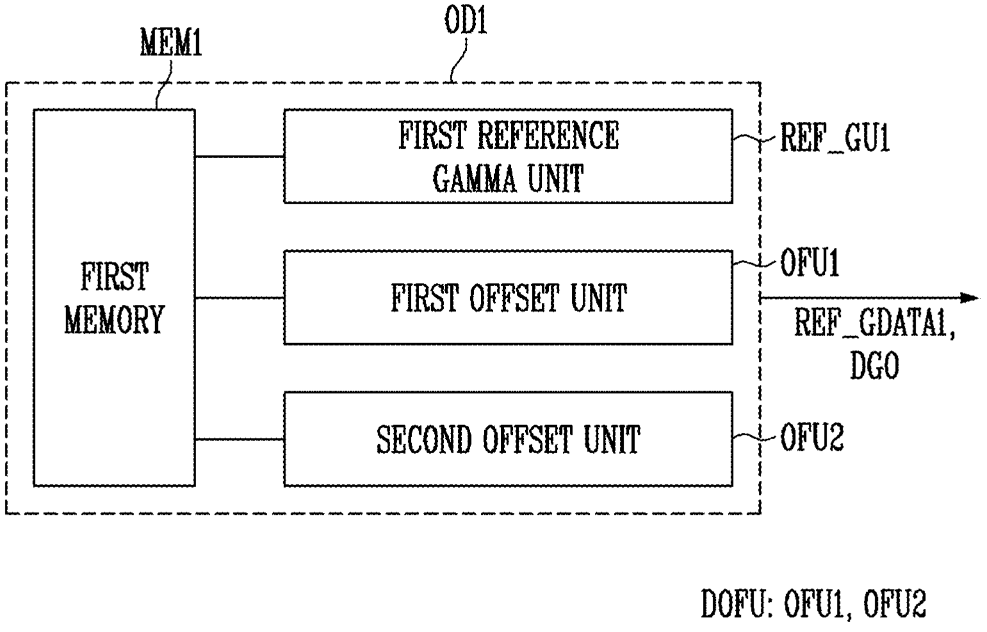
FIG. 5 is a block diagram illustrating components of a first offset determiner of FIG. 4.
Figure 6:
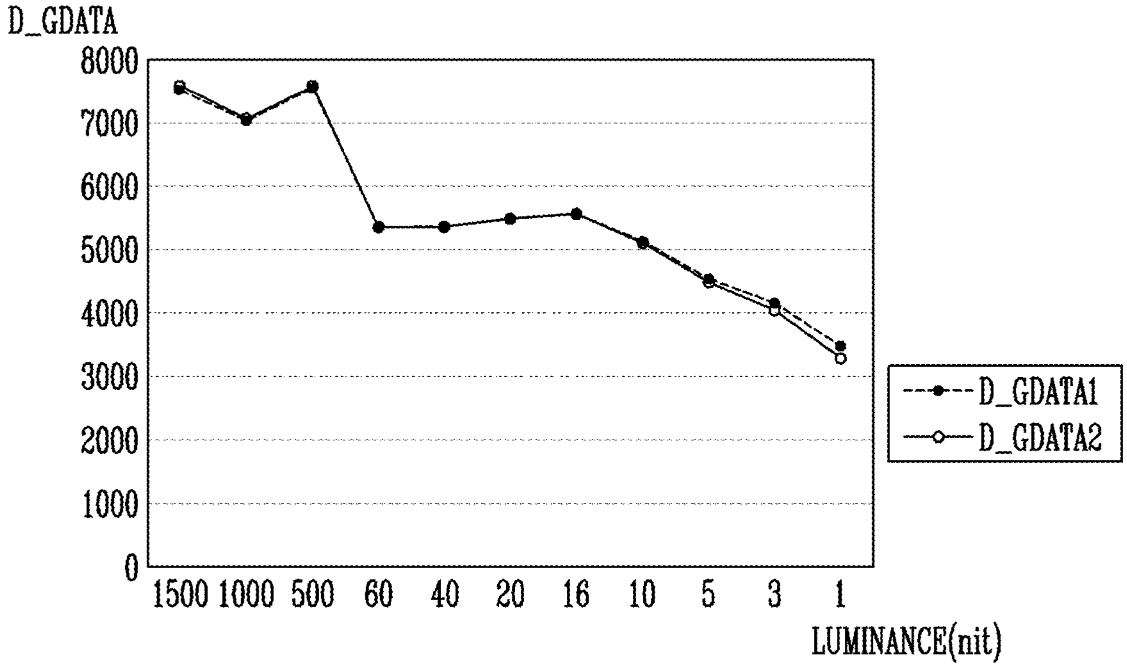
FIG. 6 is a diagram showing a graph of a digital gamma voltage of a comparative example according to luminance of an image displayed by a display panel.
Figure 7:
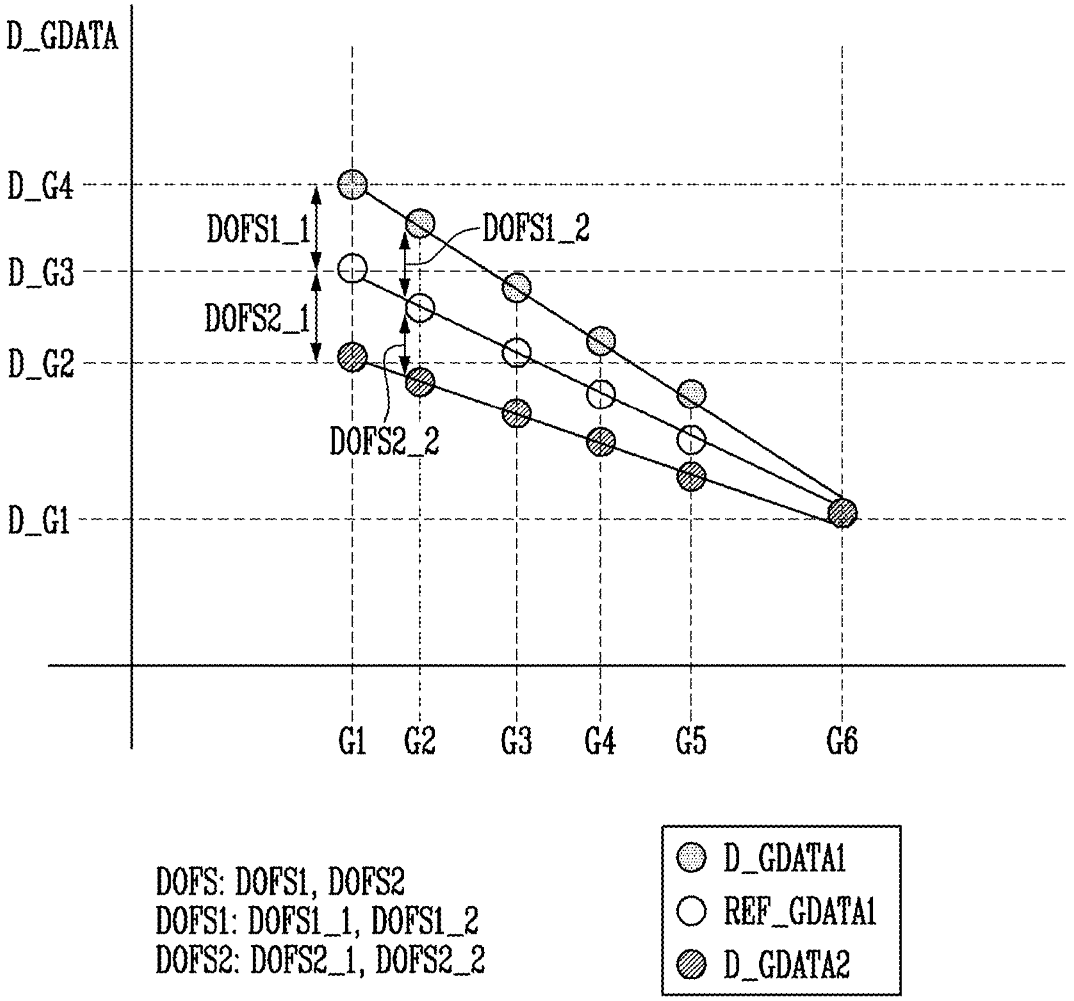
FIG. 7 is a diagram showing graphs of a first digital gamma voltage, a second digital gamma voltage, and a first reference gamma voltage according to a gamma code.

FIG. 4 is a block diagram illustrating an embodiment of a digital gamma generator included in the data driver of FIG. 3. FIG. 5 is a block diagram illustrating components of a first offset determiner of FIG. 4. FIG. 6 is a diagram showing a graph of a digital gamma voltage of a comparative example according to luminance of an image displayed by a display panel. FIG. 7 is a diagram showing graphs of a first digital gamma voltage, a second digital gamma voltage, and a first reference gamma voltage according to a gamma code.

Referring to FIGS. 4 and 5, a digital gamma generator 132 may include a first offset determiner OD1 and a digital gamma calculator DGC.

The first offset determiner OD1 may output a reference gamma voltage and a digital gamma voltage offset DGO. In an embodiment, the first offset determiner OD1 may transmit a reference gamma voltage and the digital gamma voltage offset DGO to the digital gamma calculator DGC, for example. In an embodiment, the reference gamma voltage may include a first reference gamma voltage REF_GDATA1 (refer to FIGS. 4, 5 and 7, for example) and a second reference gamma voltage REF_GDATA2 (refer to FIGS. 8, 9 and 10, for example).

The digital gamma calculator DGC may receive image data DATA, the reference gamma voltage, and the digital gamma voltage offset DGO. Accordingly, the digital gamma calculator DGC may generate a digital gamma voltage D_GDATA.

FIG. 6 shows a graph showing a trend of the digital gamma voltage D_GDATA according to luminance of an image displayed by a display panel DP. A first digital gamma voltage D_GDATA1 and a second digital gamma voltage D_GDATA2 may have different driving frequencies. In an embodiment, the first digital gamma voltage D_GDATA1 may be the digital gamma voltage D_GDATA when a driving frequency of the display device DD (see FIG. 1) is a first frequency, for example. In addition, the second digital gamma voltage D_GDATA2 may be the digital gamma voltage D_GDATA when the driving frequency of the display device DD is a second frequency. Here, the first frequency may be 120 Hz, and the second frequency may be 60 Hz. However, this is merely one of embodiments, and the invention is not limited thereto.

According to the comparison example, a deviation between values of the digital gamma voltage D_GDATA may occur at different driving frequencies. In an embodiment, when luminance of an image displayed by the display panel DP is 1 nit, a difference between values of the first digital gamma voltage D_GDATA1 and the second digital gamma voltage D_GDATA2 may be greater as compared to when the luminance of the image displayed by the display panel DP is 3 nits, for example. Accordingly, according to the comparative example, the values of the digital gamma voltage D_GDATA may all be stored for each driving frequency in a first memory MEM1. In other words, the first memory MEM1 according to the comparative example may need to store the values of the digital gamma voltage D_GDATA for each of driving frequencies and each of luminance values of the image expressed by the display panel DP, and thus a relatively large storage capacity may be desired for the first memory MEM1.

Referring to FIGS. 4, 5, and 7, the first offset determiner OD1 may include a first reference gamma unit REF_GU1, digital offset units DOFU and the first memory MEM1.

The first reference gamma unit REF_GU1 may set a first reference gamma voltage REF_GDATA1. The digital offset units DOFU may set digital offsets DOFS respectively corresponding to a plurality of driving frequencies.

Referring to FIG. 7, the digital gamma voltages D_GDATA may include the first digital gamma voltage D_GDATA1 and the second digital gamma voltage D_GDATA2. The first digital gamma voltage D_GDATA1 may be the digital gamma voltages D_GDATA for each gamma code according to the first frequency. The second digital gamma voltage D_GDATA2 may be the digital gamma voltages D_GDATA for each gamma code according to the second frequency. In an embodiment, the first frequency may be 120 Hz, and the second frequency may be 60 Hz, but is not limited thereto. Here, the gamma code may be a digital input value corresponding to a gamma voltage, and the digital gamma voltages D_GDATA may correspond to values disposed on a straight line corresponding to a first-order equation for the gamma code.

The first reference gamma unit REF_GU1 may set a representative value of the first digital gamma voltage D_GDATA1 and the second digital gamma voltage D_GDATA2 as the first reference gamma voltage REF_GDATA1. The first reference gamma unit REF_GU1 may set the representative value (e.g., an average value) of the first digital gamma voltage D_GDATA1 and the second digital gamma voltage D_GDATA2 as the first reference gamma voltage REF_GDATA1. In an embodiment, the first reference gamma unit REF_GU1 may set the first reference gamma voltage REF_GDATA1 in a first gamma code G1 to a third digital gamma value D_G3 that is an intermediate value between a second digital gamma value D_G2 and a fourth digital gamma value D_G4, for example. The first reference gamma unit REF_GU1 may store a plurality of first reference gamma voltages REF_GDATA1 set according to such a method.

The digital offset units DOFU may include a first offset unit OFU1 and a second offset unit OFU2. Although two digital offset units DOFU are illustrated in FIG. 5, this is merely one of embodiments, and the invention is not limited thereto. In an embodiment, the first offset determiner OD1 may include three or more digital offset units DOFU, for example.

The first offset unit OFU1 may calculate first digital offsets DOFS1 corresponding to the first frequency when the driving frequency of the display panel DP is the first frequency. In other words, the first digital offsets DOFS1 may be difference values between the first reference gamma voltage REF_GDATA1 and the first digital gamma voltage D_GDATA1. In an embodiment, a 1_1 digital offset DOFS1_1 may be the difference value between the first reference gamma voltage REF_GDATA1 and the first digital gamma voltage D_GDATA1 in the first gamma code G1, for example. A 1_2 digital offset DOFS1_2 may be the difference value between the first reference gamma voltage REF_GDATA1 and the first digital gamma voltage D_GDATA1 in a second gamma code G2.

The second offset unit OFU2 may include second digital offsets DOFS2 corresponding to the second frequency. The second digital offset DOFS2 may be difference values between the first reference gamma voltage REF_GDATA1 and the second digital gamma voltage D_GDATA2. In an embodiment, a 2-1 digital offset DOFS2_1 may be the difference value between the first reference gamma voltage REF_GDATA1 and the second digital gamma voltage D_GDATA2 in the first gamma code G1, for example. A 2_2 digital offset DOFS2_2 may be the difference value between the first reference gamma voltage REF_GDATA1 and the second digital gamma voltage D_GDATA2 in the second gamma code G2.

The first memory MEM1 may store the first reference gamma voltage REF_GDATA1 and the digital offsets DOFS. In an embodiment, the first memory MEM1 may store the first reference gamma voltage REF_GDATA1 set by the first reference gamma unit REF_GU1, for example. The first memory MEM1 may store the first digital offsets DOFS1, which correspond to the first frequency, set by the first offset unit OFU1. The first memory MEM1 may store the second digital offsets DOFS2, which correspond to the second frequency, set by the second offset unit OFU2.

The digital gamma generator 132 may output the digital gamma voltage D_GDATA based on the first reference gamma voltage REF_GDATA1, the digital gamma voltage offset DGO, and the image data DATA. Here, the digital gamma voltage D_GDATA may be gamma values corrected through the digital offset DOFS. In other words, in this case, when the display panel DP is driven at the first frequency, the digital gamma voltage offset DGO may be the first digital offset DOFS1, and the digital gamma voltage D_GDATA may be a value obtained by adding the first digital offset DOFS1 to the first reference gamma voltage REF_GDATA1. Accordingly, the digital gamma voltage D_GDATA may be generated based on the first reference gamma voltage REF_GDATA1 corrected through the digital gamma voltage offset DGO and the image data DATA.

In an embodiment of the disclosure, the storage capacity of the first memory MEM1 may not be relatively insufficient. In an embodiment, the first memory MEM1 may store the first reference gamma voltage REF_GDATA1 and the digital offsets DOFS, and the digital gamma calculator DGC may apply the digital offsets DOFS corresponding to the first reference gamma voltage REF_GDATA1 to output the digital gamma voltage D_GDATA, for example. Accordingly, the digital gamma generator 132 may not store values of the digital gamma voltage D_GDATA for each driving frequency in the first memory MEM1, and the addition of a gamma set accordingly may not be desired while varying the driving frequency of the display panel DP. That is, a storage space of the first memory MEM1 may be relatively further secured.

Figure 8:
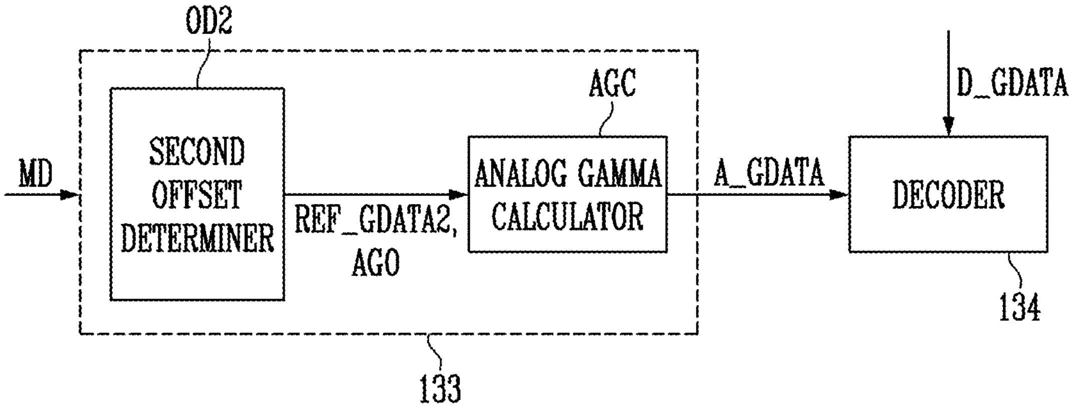
FIG. 8 is a block diagram illustrating a second offset determiner and a data voltage generator of FIG. 4.
Figure 9:
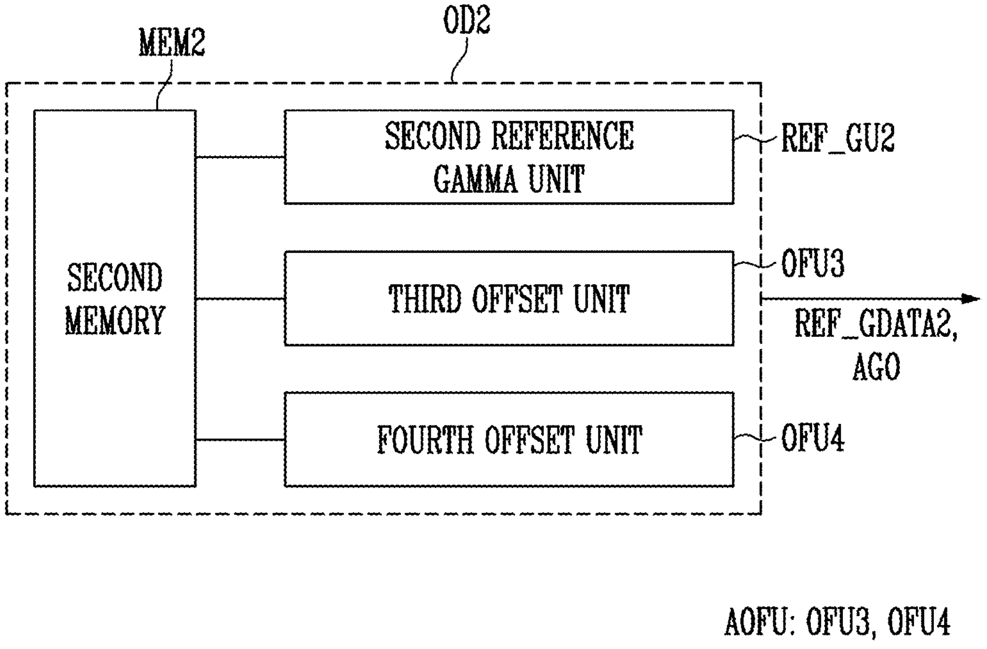
FIG. 9 is a block diagram illustrating components of the second offset determiner of FIG. 8.
Figure 10:
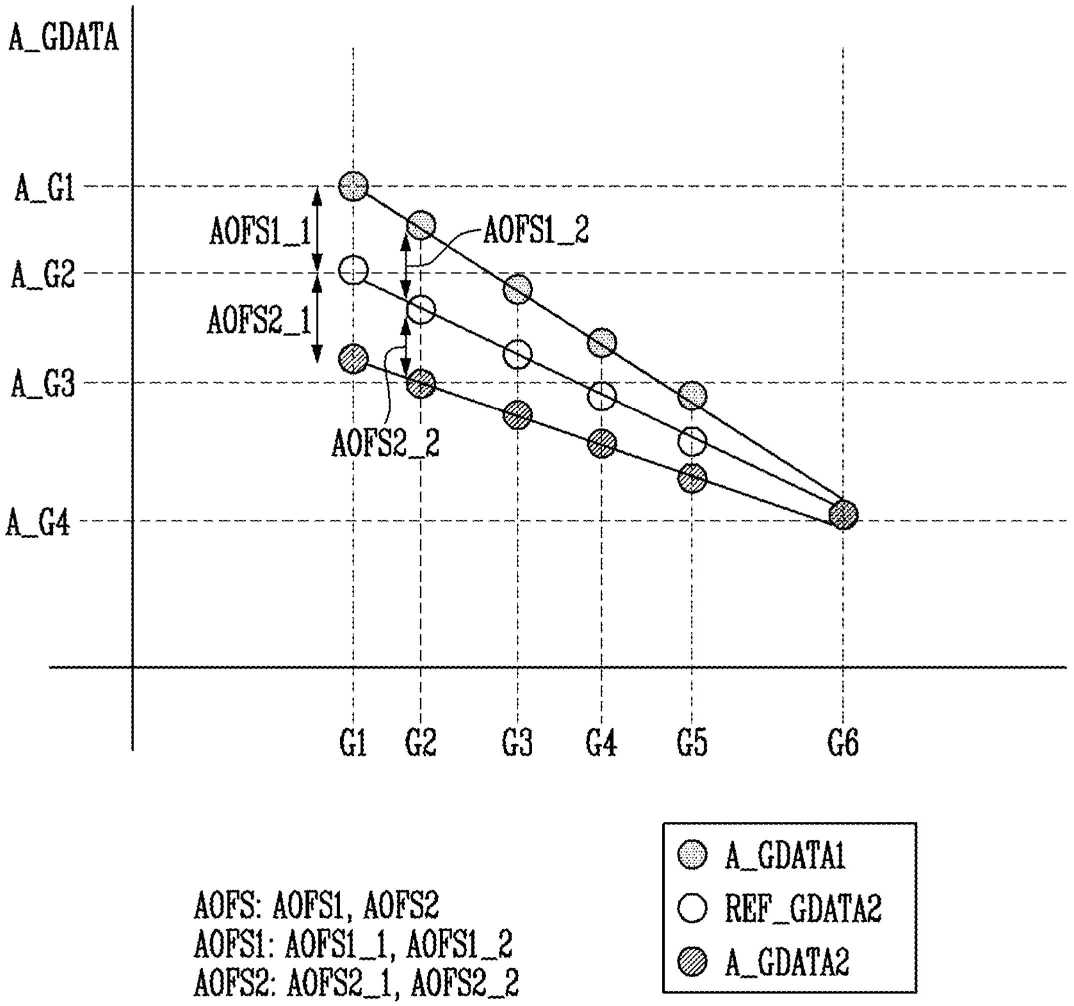
FIG. 10 is a diagram illustrating graphs of a first analog gamma voltage, a second analog gamma voltage, and a second reference gamma voltage according to a gamma code.

FIG. 8 is a block diagram illustrating a second offset determiner and a data voltage generator of FIG. 4. FIG. 9 is a block diagram illustrating components of the second offset determiner of FIG. 8. FIG. 10 is a diagram illustrating graphs of a first analog gamma voltage, a second analog gamma voltage, and a second reference gamma voltage according to a gamma code.

Referring to FIGS. 8 to 10, an analog gamma generator 133 may include a second offset determiner OD2 and an analog gamma calculator AGC. The analog gamma generator 133 may output an analog gamma voltage A_GDATA to a digital voltage generator (or a decoder) 134. In FIG. 8, for a more intuitive description, the digital voltage generator (or decoder) 134 is illustrated as receiving the analog gamma voltage A_GDATA and a data gamma voltage D_GDATA. However, the digital voltage generator (or decoder) 134 of FIG. 8 may be the same as the data voltage generator 134 of FIG. 3 or may be a component of the data voltage generator 134.

The second offset determiner OD2 may generate a second reference gamma voltage REF_GDATA2 and an analog gamma voltage offset AGO based on mode data MD. The second offset determiner OD2 may transmit the generated second reference gamma voltage REF_GDATA2 and the analog gamma voltage offset AGO to the analog gamma calculator AGC.

The analog gamma calculator AGC may generate the analog gamma voltage A_GDATA by applying the analog gamma voltage offset AGO to the second reference gamma voltage REF_GDATA2. In an embodiment, the analog gamma calculator AGC may generate the analog gamma voltage A_GDATA based on the second reference gamma voltage REF_GDATA2 that is compensated by applying the analog gamma voltage offset AGO, for example.

The decoder 134 may output a data voltage V_DATA (refer to FIG. 3) based on the digital gamma voltage D_GDATA and the analog gamma voltage A_GDATA. In an embodiment, by gamma voltages GDATA, the decoder 134 may convert a corrected digital input value in image data DATA in a digital form into a data signal (or data voltage) in an analog form, for example. In an embodiment, the decoder 134 may select a gamma voltage corresponding to the corrected digital input value in the image data DATA among the gamma voltages GDATA to generate a data signal, for example.

The second offset determiner OD2 may include a second reference gamma unit REF_GU2, analog offset units AOFU, and a second memory MEM2.

The second reference gamma unit REF_GU2 may set the second reference gamma voltage REF_GDATA2. The analog offset units AOFU may set analog offsets AOFS corresponding to each of gradations of a display panel DP.

The analog gamma voltages A_GDATA may include a first analog gamma voltage A_GDATA1 and a second analog gamma voltage A_GDATA2.

Gradations (or luminances) of the display panel DP (refer to FIG. 1) to be expressed through the first analog gamma voltage A_GDATA1 and the second analog gamma voltage A_GDATA2 may be different. In an embodiment, the first analog gamma voltage A_GDATA1 may be the analog gamma voltages A_GDATA for each gamma code according to a first gradation, for example. In other words, the first analog gamma voltage A_GDATA1 may be values corresponding to a plurality of driving frequencies when the display panel DP (refer to FIG. 1) expresses the first gradation. The second analog gamma voltage A_GDATA2 may be the analog gamma voltages A_GDATA for each gamma code according to a second gradation. The analog gamma voltages A_GDATA may correspond to values disposed on a straight line corresponding to a first-order equation for a gamma code.

The second reference gamma unit REF_GU2 may set a representative value of the first analog gamma voltage A_GDATA1 and the second analog gamma voltage A_GDATA2 as the second reference gamma voltage REF_GDATA2. In an embodiment, the second reference gamma unit REF_GU2 may set the representative value (e.g., an average value) of the first analog gamma voltage A_GDATA1 and the second analog gamma voltage A_GDATA2 as the second reference gamma voltage REF_GDATA2, for example. In other words, the second reference gamma unit REF_GU2 may set the second reference gamma voltage REF_GDATA2 in a first gamma code G1 to a third analog gamma value A_G3 which is an intermediate value between a second analog gamma value A_G2 and a fourth analog gamma value A_G4. The second reference gamma unit REF_GU2 may store the second reference gamma voltage REF_GDATA2 set according to such a method.

The analog offset units AOFU may include a third offset unit OFU3 and a fourth offset unit OFU4. Although two analog offset units AOFU are illustrated in FIG. 5, this is merely one of embodiments, and the invention is not limited thereto. In an embodiment, the second offset determiner OD2 may include three or more analog offset units AOFU, for example.

The third offset unit OFU3 may calculate first analog offsets AOFS1 corresponding to the first gradation when the gradation of the display panel DP is the first gradation. In this case, the first analog offsets AOFS1 may be difference values between the second reference gamma voltage REF_GDATA2 and the first analog gamma voltage A_GDATA1. In an embodiment, a 1_1 analog offset AOFS1_1 may be the difference value between the second reference gamma voltage REF_GDATA2 and the first analog gamma voltage A_GDATA1 in the first gamma code G1, for example. A 1_2 analog offset AOFS1_2 may be the difference value between the second reference gamma voltage REF_GDATA2 and the first analog gamma voltage A_GDATA1 in a second gamma code G2.

The fourth offset unit OFU4 may calculate second analog offsets AOFS2 corresponding to the second gradation when the gradation of the display panel DP is the second gradation different from the first gradation. The second analog offsets AOFS2 may be difference values between the second reference gamma voltage REF_GDATA2 and the second analog gamma voltage A_GDATA2. In an embodiment, a 2_1 analog offset AOFS2_1 may be the difference value between the second reference gamma voltage REF_GDATA2 and the second analog gamma voltage A_GDATA2 in the first gamma code G1, for example. A 2_2 analog offset AOFS2_2 may be the difference value between the second reference gamma voltage REF_GDATA2 and the second analog gamma voltage A_GDATA2 in the second gamma code G2.

The second memory MEM2 may store the second reference gamma voltage REF_GDATA2 and analog offsets AOFS. In an embodiment, the second memory MEM2 may store the second reference gamma voltage REF_GDATA2 set by the second reference gamma unit REF_GU2, for example. The second memory MEM2 may store the first analog offsets AOFS1, which correspond to the first gradation, set by the third offset unit OFU3. The second memory MEM2 may store the second analog offsets AOFS2, which correspond to the second gradation, set by the fourth offset unit OFU4.

The analog gamma generator 133 may include one or more resistor strings including or consisting of a plurality of resistors. In this case, the second reference gamma voltage REF_GDATA2 may be divided according to the plurality of resistors. In other words, the second reference gamma voltage REF_GDATA2 may be provided to output buffers by being selected from voltages obtained by dividing a driving voltage applied to the analog gamma generator 133. In this case, one of the divided voltages may define a minimum value of a range of the second reference gamma voltage REF_GDATA2, and a remaining (the other) one of the divided voltages may define a maximum value of the range of the second reference gamma voltage REF_GDATA2.

In an embodiment of the disclosure, only one reference gamma voltage rather than a plurality of reference gamma voltages may be stored in the second memory MEM2. In an embodiment, the analog gamma generator 133 may set the second reference gamma voltage REF_GDATA2 which is a representative value (that is, an average value) of the first analog gamma voltage A_GDATA1 and the second analog gamma voltage A_GDATA2, for example. Accordingly, after one second reference gamma voltage REF_GDATA2 is stored, the second reference gamma voltage REF_GDATA2 may be compensated for to correspond to a plurality of frequencies through the analog offset AOFS. Therefore, a storage space of the first memory MEM1 may be relatively further secured.

Figure 11:
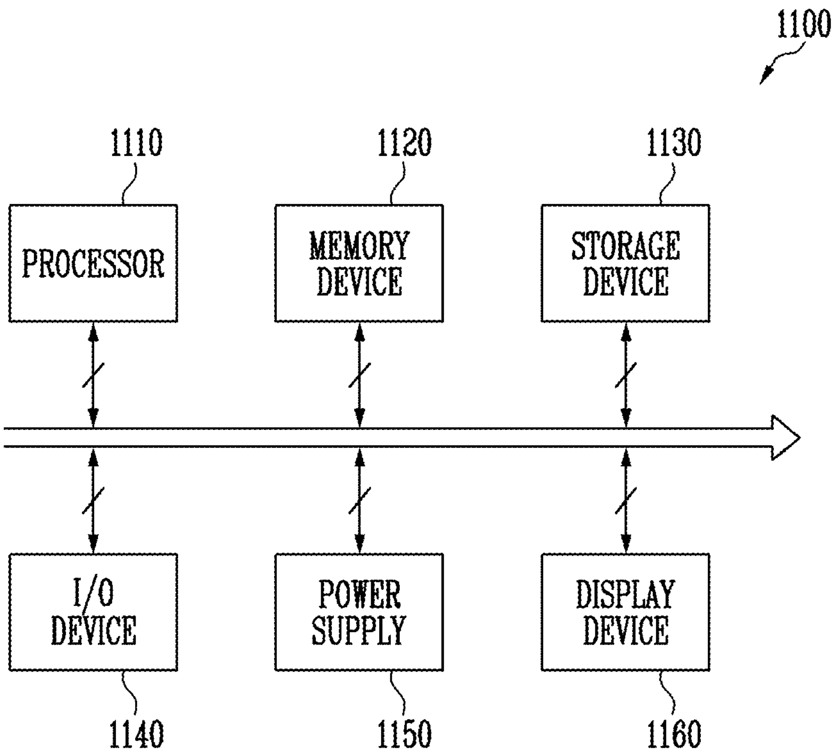
FIG. 11 is a block diagram illustrating an embodiment of an electronic apparatus according to the disclosure.

FIG. 11 is a block diagram illustrating an embodiment of an electronic apparatus according to the disclosure.

Referring to FIG. 11, an electronic apparatus 1100 may include a processor 1110, a memory device 1120, a storage device 1130, an input/output device 1140, a power supply 1150, and a display device 1160. In this case, the display device 1160 may be the display device of FIG. 1. In addition, the electronic apparatus 1100 may further include various ports that may communicate with a video card, a sound card, a memory card, a universal serial bus ("USB") device, or the like, or may communicate with other systems. In an embodiment, the electronic apparatus 1100 may be implemented as a smartphone. In an embodiment, the electronic apparatus 1100 may be implemented as a tablet personal computer ("PC"). However, this is merely one of embodiments, and the electronic apparatus 1100 is not limited thereto. In an embodiment, the electronic apparatus 1100 may be implemented as a mobile phone, a video phone, a smart pad, a smart watch, a vehicle navigation apparatus, a computer monitor, a laptop, a head mounted display apparatus, or the like, for example.

The processor 1110 may perform predetermined calculations or tasks. By embodiments, the processor 1110 may be a microprocessor, a central processing unit, an application processor, or the like. The processor 1110 may be connected to other components through an address bus, a control bus, and a data bus. By embodiments, the processor 1110 may also be connected to an expansion bus such as a peripheral component interconnect ("PCI") bus.

The memory device 1120 may store data desired for the operation of the electronic apparatus 1100. In an embodiment, the memory device 1120 may include non-volatile memory devices such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano-floating gate memory ("NFGM") device, a polymer random access memory ("PoRAM") device, a magnetic random access memory ("MRAM") device, and a ferroelectric random access memory ("FRAM") device, and/or volatile memory devices such as a dynamic random access memory ("DRAM") device, a static random access Memory ("SRAM") device, and a mobile DRAM device, for example.

The storage device 1130 may include a solid state drive ("SSD"), a hard disk drive ("HDD"), a compact disc read-only memory ("CD-ROM"), or the like.

The input/output device 1140 may include an input means such as a keyboard, a keypad, a touchpad, a touch screen, or a mouse and an output means such as a speaker or a printer. By embodiments, the display device 1160 may be included in the input/output device 1140.

The power supply 1150 may supply power desired for the operation of the electronic apparatus 1100. In an embodiment, the power supply 1150 may be a power management integrated circuit ("PMIC"), for example.

The display device 1160 may display an image corresponding to visual information of the electronic apparatus 1100. In this case, the display device 1160 may be an organic light-emitting display device or a quantum dot light-emitting display device, but is not limited thereto. The display device 1160 may be connected to other components through the buses or other communication links. The display device 1160 of FIG. 11 may be described similarly to the display device DD of FIG. 1.

According to a display device and an electronic apparatus of the invention, a driving frequency of a display panel may be freely varied, and also a relatively sufficient storage space may be secured.

The effects according to the disclosure is not limited to the contents exemplified above, and more various effects are included in the specification.

Although illustrative embodiments and applications have been described herein, other embodiments and modification's may be derived from the above description. Accordingly, the inventive invention is not limited to such embodiments, but rather to the broader scope of the presented claims and various obvious modifications and equivalent arrangements.

What is claimed is:

1. A display device comprising:

a display panel including pixels; and a data driver configured to generate a data voltage based on image data, the data driver including:

a mode determiner configured to generate mode data about driving of the display panel;

a gamma generator configured to generate an analog gamma voltage and a digital gamma voltage based on the mode data; and a data voltage generator configured to generate a data voltage based on the analog gamma voltage and the digital gamma voltage, wherein the mode data includes information about a driving frequency of the display panel and a gradation of an image displayed by the display panel.

2. The display device of claim 1, wherein the gamma generator includes a digital gamma generator configured to generate the digital gamma voltage, the digital gamma generator includes a first offset determiner including a first reference gamma unit configured to calculate a first reference gamma voltage, and the first reference gamma voltage has a representative value of a first digital gamma voltage and a second digital gamma voltage which is different from the first digital gamma voltage.

3. The display device of claim 2, wherein the gamma generator includes an analog gamma generator configured to generate the analog gamma voltage, and the analog gamma generator includes a second offset determiner including a second reference gamma unit configured to generate a second reference gamma voltage.

4. The display device of claim 3, wherein the second reference gamma voltage has a representative value of a first analog gamma voltage and a second analog gamma voltage which is different from the first analog gamma voltage.

5. The display device of claim 4, wherein the first analog gamma voltage is gamma data when a predetermined area of the display panel is driven at first luminance, and the second analog gamma voltage is gamma data when the predetermined area of the display panel is driven at second luminance different from the first luminance.

6. The display device of claim 5, wherein the second offset determiner includes:

a third offset unit configured to calculate a first analog offset which is a difference value between values of the first analog gamma voltage and values of the first reference gamma voltage; and a fourth offset unit configured to calculate a second analog offset which is a difference value between values of the second digital gamma voltage and the values of the first reference gamma voltage.

7. The display device of claim 6, wherein the second offset determiner includes a second memory configured to store the second reference gamma voltage, the first analog offset, and the second analog offset.

8. The display device of claim 7, wherein the second offset determiner outputs an analog gamma voltage offset by selecting one of the first analog offset and the second analog offset based on the mode data.

9. The display device of claim 8, wherein the analog gamma generator includes a digital gamma calculator configured to output a digital gamma voltage based on the second reference gamma voltage, the analog gamma voltage offset, and the image data.

10. The display device of claim 2, wherein the first digital gamma voltage is gamma data for each gamma code when the display panel is driven at a first frequency, and the second digital gamma voltage is gamma data for each gamma code when the display panel is driven at a second frequency different from the first frequency.

11. The display device of claim 10, wherein the first offset determiner includes:

a first offset unit configured to calculate a first digital offset which is a difference value between values of the first digital gamma voltage and values of the first reference gamma voltage; and a second offset unit configured to calculate a second digital offset which is a difference value between values of the second digital gamma voltage and the values of the first reference gamma voltage.

12. The display device of claim 11, wherein the first offset determiner includes a first memory configured to store the first reference gamma voltage, the first digital offset, and the second digital offset.

13. The display device of claim 12, wherein the first offset determiner outputs a digital gamma voltage offset by selecting one of the first digital offset and the second digital offset based on the mode data.

14. The display device of claim 13, wherein the digital gamma generator includes a digital gamma calculator configured to output the digital gamma voltage based on the first reference gamma voltage, the digital gamma voltage offset, and the image data.

15. An electronic apparatus comprising:

a processor configured to provide image data to a display device; and the display device configured to display an image based on the image data, the display device including:

a display panel including pixels; and a data driver configured to generate a data voltage based on the image data, the data driver including:

a mode determiner configured to generate mode data about driving of the display panel;

a gamma generator configured to generate an analog gamma voltage and a digital gamma voltage based on the mode data; and a data voltage generator configured to generate a data voltage based on the analog gamma voltage and the digital gamma voltage, wherein the mode data includes information about a driving frequency of the display panel and a gradation of an image displayed by the display panel.

16. The electronic apparatus of claim 12, wherein the gamma generator includes a digital gamma generator configured to generate the digital gamma voltage, the digital gamma generator includes a first offset determiner including a first reference gamma unit configured to calculate a first reference gamma voltage, and the first reference gamma voltage has a representative value of a first digital gamma voltage and a second digital gamma voltage which is different from the first digital gamma voltage.

17. The electronic apparatus of claim 16, wherein the first digital gamma voltage is gamma data for each gamma code when the display panel is driven at a first frequency, and the second digital gamma voltage is gamma data for each gamma code when the display panel is driven at a second frequency different from the first frequency.

18. The electronic apparatus of claim 17, wherein the first offset determiner includes:

a first offset unit configured to calculate a first digital offset which is a difference value between values of the first digital gamma voltage and values of the first reference gamma voltage; and a second offset unit configured to calculate a second digital offset which is a difference value between values of the second digital gamma voltage and the values of the first reference gamma voltage.

19. The electronic apparatus of claim 18, wherein the first offset determiner includes a first memory configured to store the first reference gamma voltage, the first digital offset, and the second digital offset.

20. The electronic apparatus of claim 19, wherein the first offset determiner outputs a digital gamma voltage offset by selecting one of the first digital offset and the second digital offset based on the mode data.

* * * * *